3,059,029
PROCESS FOR ALKYL AND ARALKYL
BIGUANIDES
Karl Geiger, Dobbs Ferry, Seymour L. Shapiro, Hastings-on-Hudson, and Louis Freedman, Bronxville, N.Y., assignors to U.S. Vitamin and Pharmaceutical Corporation, a corporation of Delaware
No Drawing. Filed Oct. 29, 1959, Ser. No. 849,458
8 Claims. (Cl. 260—564)

This invention is concerned with a novel process for the preparation of alkyl and aralkyl biguanides. More particularly, it is concerned with a process which permits the synthesis of such alkyl and aralkyl biguanides in high yield, in a high degree of purity, with a minimum of equipment, operating demands, and in an economical manner.

Although aryl biguanides have been readily accessible through the reaction of the arylamine hydrochloride and dicyandiamide in an aqueous medium, or alternatively, through the use of the arylamine, an equivalent quantity of a strong mineral acid, and dicyandiamide in an aqueous medium, the preparation of alkyl and aralkyl biguanides has necessitated much more difficult and tedious routes. In particular, the methods in aqueous media similar to those employed for the synthesis of aryl biguanides have been largely unsuccessful.

Instead, preparation of alkyl or aralkyl biguanides has required synthetic procedures such as those of Slotta and Tschesche (Ber. 62B, 1398 (1928)) which entail isolation and purification through the biguanide copper complex salt, and subsequent removal of the copper by precipitation with hydrogen sulfide. This procedure is cumbersome, time-consuming, involves use of toxic hydrogen sulfide, and is not generally adaptable to large scale production.

Alternatively, fusion of the alkyl or aralkylamine salt of a strong acid with dicyandimaide following the procedure of Bobeck, Ann., 487, 294 (1931) has been applied in a number of instances. This procedure has the inherent disadvantage that it is difficult to control and frequently, as the reaction in the fusion mixture to the formed biguanide begins, a vigorous exothermic reaction ensues which is difficult to control and leads to undesirable side products, particularly guanidines, which are frequently separable only with difficulty from the desired biguanide. Additionally, in this fusion procedure, the reactant melt when cooled does not crystallize, and instead, solidifies to a glass containing a number of side products whose separation involves ultimate sacrifice of the purity and quantity of the desired biguanide.

Additionally, for any individual synthesis, the fusion procedure introduces unpredictable aspects as to the required fusion temperature, maximal temperature of reaction and the duration of retention of the reaction mixture at a particular temperature. Departures from any of these parameters lead to accumulations of undesirable side products or unconverted reactants which in turn complicate and defeat the objective of obtaining pure alkyl and aralkyl biguanides in high yield.

Since the alkyl and aralkyl biguanides have important commercial potential in a variety of chemical fields, per se, and particularly in the instance of the selected biguanides to be discussed below as pharmaceutical agents for use in the treatment of diabetes as well as dermatological disorders to deranged carbohydrate metabolism, it is a primary objective of this invention to describe and detail a process for preparing such biguanides in pure form in large batches under economical conditions. It is an additional objective of this invention to define the working conditions for the process which permits obtaining such biguanides in pure form and good yield.

Although it is well-recognized that the aqueous procedure which has proven so effective in the synthesis of aryl biguanides has proven virtually ineffective for the preparation of alkyl and aralkyl biguanides, it is especially surprising therefore that it has now been found that the use of controlled quantities of water ranging between 12.5 and 18% of the total weight of the equimolar mixture of reactant amine hydrochloride and dicyandiamide, provide a medium in which a reaction temperature is achieved and controlled which permits the synthesis to proceed in good yield, provides a reaction temperature which does not permit undue accumulation of side products, provides a reaction concentration which permits crystallization of the relatively soluble formed alkyl or aralkyl biguanide hydrochloride from the cooled mixture and provides a reaction medium applicable to the broad spectrum of alkyl and aralkyl biguanides investigated. The process herein detailed can afford good yields of the desired biguanides by work-up of the reaction mixture at this point.

However, it has also been established that in the course of reaction of the alkyl or aralkyl amine hydrochloride with dicyandiamide and controlled quantities of water that the pH of this mixture which is initially of the order of 1.5 to 2.5, rises with continued heating to pH 6.7–7.0, and this if uncorrected, tends to lower the conversion of the reactants to the formed product, or in turn, to occasion formation of side products. It is, accordingly, another novel aspect of our synthesis to interrupt the reaction after two to four hours of refluxing and adjust to pH 4–5 by addition of mineral acid. Alternatively, the pH can be lowered by removal of alkaline vapors. Continuation of reflux for an additional two to four hours then affords increased yields and a minimum of side products.

On cooling, the formed biguanide may be separated, although preferably, additional water is added to effect solution followed by the salting out of the product by addition of inorganic salts. The agent used for salting out the product is sodium chloride which yields the biguanide as its hydrochloride salt or sodium nitrate, which yields the biguanide as its nitrate salt, although other salting-out agents may be used. The product so obtained is substantially pure, but may be further purified by conventional procedures.

It has been established that the use of quantities of water exceeding a total of 18% by weight of the reactants, results in substantial reductions in yield, marked difficulties in the isolation of the product, and in fact, in some instances, no conversion whatever. The use of water in quantities less than 12.5% results in similar difficulties.

Additionally, it has been found that the duration of the reaction conditions is desirably retained between two to eight hours' total reflux period, and that use of shorter reflux periods results in incomplete conversion of the reactants; and longer reflux periods lead to decomposition of the formed products, and poorer yields.

The invention contemplates preparation of alkyl and aralkyl biguanides of the following free base formula

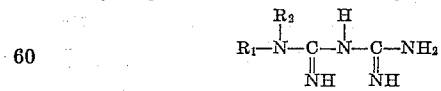

wherein $R_1$ is selected from the group consisting of $C_3$–$C_5$ alkyl and alkenyl, and $C_7$–$C_8$ aralkyl, and $R_2$ is selected from the group consisting of hydrogen and methyl.

The following examples are presented to illustrate this invention without, however, limiting the same thereto:

EXAMPLE 1

β-Phenethylbiguanide Hydrochloride

An equimolar mixture of β-phenethylamine hydrochloride and dicyandiamide was intimately mixed and 150 g. of this mixture and 22.5 g. of water were refluxed at 129°

C. for three hours, the pH was then adjusted to 4.5 by addition of 2.4 ml. of 6 N hydrochloric acid, and the excess water was removed so that the reaction was continued at 129° C. for an additional three hours. The reaction mixture was then cooled and diluted with three parts (450 ml.) of water, and warmed (to approximately 65° C.) to dissolve. Sodium chloride (63 g.) was added to the warm solution. After standing, the crystallized $\beta$-phenethylbiguanide hydrochloride was separated and dried. Yield, 102 g. (68%) M.P. 174–177° C.

The aqueous mother liquor of the above experiment was made alkaline with 60 g. of sodium hydroxide. The oil which separated was dried (sodium hydroxide), distilled, and 17.5 g. (23.4%) of $\beta$-phenethylamine, B.P. 94° C. (30 mm.) were recovered in this manner. Deduction of the $\beta$-phenethylamine recovered from the amount originally used gave 75.0 g.–17.5 g.=57.5 g. of amine consumed which should afford 115.0 g. of title product. Yield found was 102 g. (88.7%).

EXAMPLE 2

N-Butylbiguanide Nitrate

Equimolar portions of n-butylamine (56.6 g.) and hydrochloric acid (64.4 ml.) were combined with cooling to form a solution of n-butylamine hydrochloride. An equimolar amount (65.1 g.) of dicyandiamide was added so that the solution had a solid content of 150 g. This solution was concentrated until the water content reached 15% of the total solid content. This solution boiled at 136.3° C. (760 mm.) and was refluxed for 3 hours. The pH was adjusted to 4.5 by addition of 2.55 ml. of 6 N hydrochloric acid and the reaction mixture maintained at reflux at 136.3° C. by removal of water, and then refluxed for an additional 3 hours. The cooled reaction mixture was diluted with 3 parts of water (450 ml.) and warmed to 80° C., 222 g. of sodium nitrate added, and when cool the crystallized n-butylbiguanide nitrate separated. The product was washed in 125 ml. of 42% aqueous sodium nitrate solution, filtered and dried. Yield, 112 g. (65.8%) of n-butylbiguanide nitrate, M.P. 117–124° C.

The aqueous mother liquor of the above experiment was made alkaline with 60 g. of sodium hydroxide. The oil which separated was dried (sodium hydroxide) and distilled. n-Butylamine (10.3 g., 18.2%), B.P. 77.8° C. (760 mm.) was recovered. The reacted n-butylamine was 56.6 g.–10.3 g.=46.3 g., and the yield of the title product on this basis is 80.7%.

EXAMPLE 3

$\beta$-Phenethylbiguanide Hydrochloride

This example illustrates the adaptability of the process to large scale operation.

To 125 lbs. of $\beta$-phenethylamine was added an equimolar amount of hydrochloric acid (with cooling), followed by 86.8 lbs. of dicyandiamide. This solution, having a solid content of 249.2 lbs., was concentrated until the water content reached 15% of the total solid reactants. This solution boiled at 129° C. (760 mm.) and was refluxed at this temperature for 3 hours. During this interval, the reflux temperature, which decreases as a consequence of the reaction, was readjusted to 129° C. as necessary by removal of water. After cooling to 80° C., 393 lbs. of isopropyl alcohol was added, and after storage at 20° C. for 20 hours, the crystallized product was separated. Yield, 124 lbs. 12 oz. (49.9%), M.P. 174–177° C. The mother liquor obtained from this run was freed from isopropanol and after addition of water was brought to reflux at 129° C. The reaction and isolation were carried out as above and converted the residual reactants to an additional quantity of product. Yield, 35 lbs. 8 oz. (14.9%), M.P. 175–179° C.

The mother liquor from the second conversion was reacted to give a somewhat lower melting product, M.P. 157–166° C. (24 lbs. 8 oz.). This gave, after recrystallization (85% isopropanol), 13 lbs. 12 oz. of product, M.P. 175–178° C. (6.95%). The total yield in this manner was 71.8%.

When a relatively large batch (a total of 5000 g. of equimolar portions of $\beta$-phenethylamine hydrochloride and dicyandiamide) was fused following the fusion procedure for synthesis of biguanides as Bobeck, the internal temperature rose to 147° C. (maximum bath temperature 138° C.) and a 26.6% yield of crude product, M.P. 125–175° C. was obtained.

EXAMPLE 4

$\beta$-Phenethylbiguanide Hydrochloride

This example illustrates a scale-up of Example 1.

To 110 lbs. of $\beta$-phenethylamine was added, with cooling, an equimolar amount of hydrochloric acid (final pH 2) followed by 75.5 lbs. of dicyandiamide. This solution having a solid content of 219.45 lbs. was concentrated until the water content reached 15% of the total solid. The solution boiled at 129° C. (760 mm.) and was refluxed at this temperature for 3 hours. (The boiling point which decreases as a consequence of the reaction was readjusted as necessary to 129° C. by removal of water.) The pH of the reaction mixture after this interval which had risen to 7 was readjusted to pH 4.5 by addition of 1795 g. of 6 N hydrochloric acid. The boiling point of the reaction mixture was adjusted to 129° C. and the refluxing continued for an additional 3 hours. The solution was diluted with 3 parts of water (660 lbs.) and the formed $\beta$-phenethylbiguanide hydrochloride precipitated by addition of 97 lbs. of sodium chloride. The product was separated after storage of reaction mixture at 20° C. for 20 hours and washed with 14% sodium chloride solution. Theoretical yield, 219 lbs. 8 oz. Yield, 136 lbs. 8 oz. (62.2%), M.P. 174–177° C.

The reaction mother liquor and the washes were combined and 20% weight/volume of solid sodium hydroxide added. The unreacted $\beta$-phenethylamine (21 lbs. 8 oz.) was separated and recovered by distillation as described previously. The yield based on the amine reacted was 77.5%.

To illustrate the scope and workability of this present invention, the biguanides prepared by this process have been assembled in Tables I and II. Inasmuch as some of the reactant amines are relatively expensive, the tables as well as the examples which have been detailed above, also introduce the data for recovery of unreacted amines.

TABLE I.—BIGUANIDES [a] [b]

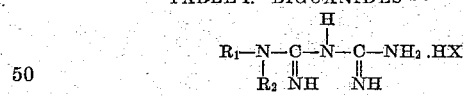

| No. | $R_1$ | $R_2$ | HX | Reaction Temperature, °C.[c] |
|---|---|---|---|---|
| 1 | $C_6H_5CH_2CH_2$— | H | HCl | 129 |
| 2 | $C_6H_5CH_2$— | $CH_3$— | HCl | 129 |
| 3 | i—$C_5H_{11}$— | H | $HNO_3$ | 134 |
| 4 | n—$C_5H_{11}$— | H | HCl | 134 |
| 5 | n—$C_4H_9$— | H | $HNO_3$ | 136.3 |
| 6 | $CH_2$=$CHCH_2$— | H | HCl | 139 |

TABLE II.—PREPARATION OF BIGUANIDES

| No. | Percent Yield | M.P., °C.[d] | Percent amine[e] recovered | Yield based on amine reacted | M.P., °C.[f] recrystallized product. |
|---|---|---|---|---|---|
| 1 | 68 | 174–177 | 23.4 | 88.7 | 176–179 |
| 2 | 73.1 | 208–211 | 8.1 | 79.5 | 209–213 |
| 3 | 66.8 | 126–130 | 18.8 | 82.5 | 135–137 |
| 4 | 46.4 | 174–177 | 18.8 | 56.8 | 179–182 |
| 5 | 65.8 | 120–123 | 18.2 | 80.7 | 127–129 |
| 6 | 47.2 | 169–184 | none | 47.2 | 182–184 |

[a] Hydrochlorides were prepared as described under Example 1, and nitrates as described under Example 2, using a quantity of water which was 15% of weight of initial reactants.
[b] When the amount in the reaction mixture was increased to correspond to 8 molar equivalents (8×18 g. of water for each mole of reactant) the yields dropped considerably as shown below

| No. | Percent Yield | M.P., °C. | Reaction Time (Hours) |
|---|---|---|---|
| 1 | 21.3 | 124–176 | 48 |
| 2 | 20.9 | 207–209 | 48 |
| 3 | 21.2 | 127–129 | 48 |
| 4 | 16.4 | 179–182 | 48 |
| 5 | 19.9 | 127–129 | 48 |
| 6 | 12.4 | 179–183 | 48 |

<sup>c</sup> The reaction temperature is a function of the dissolved salts and formed products as the reaction proceeds.
<sup>d</sup> The product as isolated is substantially pure.
<sup>e</sup> The recovery of the unreacted amine has been detailed in the examples.
<sup>f</sup> Samples of analytical purity may be obtained by recrystallization following conventional methods. Suitable solvents are given as compound number/solvent used respectively: 1/85% isopropyl alcohol; 2/water; 3/99% isopropyl alcohol; 4/acetonitrile; 5/methanol-isopropyl alcohol.

The conspicuous discrepancy in yield when approximately four times the amount of water is used in the reaction mixture as compared to the preferred method is to be noted upon inspection of footnote *b* of Table I above. Use of amounts of water above that of 8 mole equivalents is associated with even poorer effectiveness and amounts of water less than 8 mole equivalents have been shown to be relatively ineffective until the range of water utilized in this application is employed.

Various modifications may be made in the method of the present invention without departing from the spirit or scope thereof, and it is to be understood that we limit ourselves only as defined in the appended claims.

Having described the invention, what we claim as new and desire to secure by Letters Patent is:

1. A solvent process for the synthesis of salts of alkyl and aralkyl biguanides of the following free base formula:

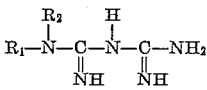

wherein $R_1$ is selected from the group consisting of $C_3$–$C_5$ alkyl and alkenyl and $C_7$–$C_8$ aralkyl, and $R_2$ is selected from the group consisting of hydrogen and methyl, comprising refluxing a mixture of substantially equivalent quantities of amine hydrochloride, $R_1R_2NH \cdot HCl$ wherein $R_1$ and $R_2$ have the same significance as recited above, and dicyandiamide, in a quantity of water acting as the reaction solvent and being in the range of about 12.5 to about 18% of the weight of the total initial reactants.

2. A process as defined in claim 1, wherein the refluxing is conducted from about 2 to 4 hours.

3. The process of claim 1 wherein the quantity of water is 15% of the total weight of initial reactants.

4. The process of claim 3 wherein $R_1$ is β-phenethyl and $R_2$ is hydrogen.

5. The process of claim 3 wherein $R_1$ is n-amyl and $R_2$ is hydrogen.

6. The process of claim 3 wherein $R_1$ is benzyl and $R_2$ is methyl.

7. The process of claim 3 wherein $R_1$ is n-butyl and $R_2$ is hydrogen.

8. The process of claim 3 wherein $R_1$ is i-amyl and $R_2$ is hydrogen.

References Cited in the file of this patent

UNITED STATES PATENTS

| | | |
|---|---|---|
| 2,149,709 | Rein | Mar. 7, 1939 |
| 2,195,073 | Baretta | Mar. 20, 1940 |
| 2,690,455 | Kaiser et al. | Sept. 8, 1954 |
| 2,889,317 | Long et al. | June 2, 1959 |

FOREIGN PATENTS

| | | |
|---|---|---|
| 1,001,254 | Germany | Jan. 29, 1957 |